(12) United States Patent
Nichols (10) Patent No.: US 10,380,861 B2
(45) Date of Patent: Aug. 13, 2019

(54) THERMOCHEMICAL TEMPERATURE INDICATORS

(71) Applicant: Bruce W. Nichols, Hamilton, AL (US)

(72) Inventor: Bruce W. Nichols, Hamilton, AL (US)

( * ) Notice: Subject to any disclaimer, the term of this patent is extended or adjusted under 35 U.S.C. 154(b) by 0 days.

(21) Appl. No.: 15/786,972

(22) Filed: Oct. 18, 2017

(65) Prior Publication Data
US 2018/0108233 A1  Apr. 19, 2018

Related U.S. Application Data

(60) Provisional application No. 62/410,041, filed on Oct. 19, 2016.

(51) Int. Cl.
| | | |
|---|---|---|
| *G01K 5/32* | (2006.01) | |
| *G08B 17/02* | (2006.01) | |
| *G01K 1/02* | (2006.01) | |
| *G01K 5/46* | (2006.01) | |
| *G01K 3/04* | (2006.01) | |

(Continued)

(52) U.S. Cl.
CPC .............. *G08B 17/02* (2013.01); *G01K 1/024* (2013.01); *G01K 3/04* (2013.01); *G01K 5/32* (2013.01); *G01K 5/34* (2013.01); *G01K 5/46* (2013.01); *G01K 11/00* (2013.01); *G01K 11/06* (2013.01); *G01K 13/00* (2013.01)

(58) Field of Classification Search
CPC .......... G01K 11/06; G01K 11/00; G01K 1/02; G01K 5/32; G01K 5/34; G01K 5/46; G01K 13/00
See application file for complete search history.

(56) References Cited

U.S. PATENT DOCUMENTS

| | | | | |
|---|---|---|---|---|
| 4,194,572 A | * | 3/1980 | Thery | A62C 3/06 169/17 |
| 4,459,046 A | | 7/1984 | Spirg | |

(Continued)

FOREIGN PATENT DOCUMENTS

| | | |
|---|---|---|
| EP | 0092027 A2 | 10/1983 |
| WO | 1993011411 A1 | 6/1993 |

OTHER PUBLICATIONS

International Search Report dated Jan. 4, 2018; International Application No. PCT/US2017/057131; International Filing Date Oct. 18, 2017; 2 pages.

(Continued)

*Primary Examiner* — Benyam Haile
(74) *Attorney, Agent, or Firm* — Blank Rome LLP; Mark J. Thronson; Matthew J. Esserman (57) ABSTRACT

A burst temperature indicator system for determining when an electrical contact or other component reaches a predetermined temperature. In operation, a trace material may disperse into a surrounding environment, and be detected, when the electrical component reaches a predetermined threshold temperature. One or more foil barriers may be ruptured or broken by temperature-induced gas pressure. According to another aspect of this disclosure, a rupture disk may be burst at a predetermined temperature to generate, or enable emission of, a light signal. According to another aspect, a rupture disk device acts as, or is associated with, an engine to drive one or more electro-mechanical and/or acoustic devices to signal the occurrence of a predetermined temperature.

5 Claims, 6 Drawing Sheets

(51) Int. Cl.
*G01K 5/34* (2006.01)
*G01K 11/06* (2006.01)
*G01K 11/00* (2006.01)
*G01K 13/00* (2006.01)

(56) References Cited

U.S. PATENT DOCUMENTS

| | | |
|---|---|---|
| 4,818,119 A | 4/1989 | Busch et al. |
| 5,033,865 A | 7/1991 | Kuze |
| 5,203,278 A | 4/1993 | Kinney |
| 5,988,102 A | 11/1999 | Volk et al. |
| 6,046,447 A | 4/2000 | Skell et al. |
| 6,189,479 B1 | 2/2001 | Hudson |
| 8,480,299 B2 | 7/2013 | Thompson |
| 8,702,304 B2 | 4/2014 | Nichols |
| 9,683,897 B2 | 6/2017 | Nichols |
| 2012/0234227 A1 | 9/2012 | Nichols |
| 2014/0211829 A1* | 7/2014 | Nichols ............... G01K 11/02 374/159 |

OTHER PUBLICATIONS

Written Opinion dated Jan. 4, 2018; International Application No. PCT/US2017/057131; International Filing Date Oct. 18, 2017; 5 pages.

English translation; International Application No. WO1993011411; Publication date Jun. 10, 1993; 8 pages.

* cited by examiner

THERMOCHEMICAL TEMPERATURE INDICATORS

CROSS-REFERENCE TO RELATED APPLICATION(S)

This application claims priority from U.S. Provisional Patent Application No. 62/410,041, filed on Oct. 19, 2016, which is hereby incorporated herein by reference in its entirety.

BACKGROUND

The electric utility industry is adopting condition-based maintenance practices which dictate that maintenance should be performed only when there is data indicating an imminent adverse change in performance or failure. As a result, the industry is moving toward requiring systems for monitoring high-voltage electrical equipment and generating online performance information. Presently, however, there is no monitoring technology that can efficiently and effectively detect when a component within high-voltage electrical equipment overheats.

A conventional method for condition assessment in high-voltage electrical equipment is dissolved gas analysis ("DGA") where the amount and types of gases dissolved in oil are analyzed to identify a trend indicating that something within the oil has overheated. DGA is subjective, and the standards are unique to each utility. In contrast to the present disclosure, DGA, even online DGA, only provides an indication related to the accumulated build-up of certain gases that indicate the oil has been overheated, a result of the insulating oil coming into contact with the overheated component surfaces. In fact, it is understood that DGA is best at detecting the gases generated during the formation and accumulation of coking, a hard coal-like deposit that accumulates on the overheated surfaces of the component. DGA does not respond immediately when an electrical device reaches a threshold temperature.

SUMMARY

The present disclosure overcomes the disadvantages and deficiencies of the prior art to a great extent by employing, among other things, a burst indicator which instantly provides an indication that the component to which it is attached (or associated with) is overheated. The devices, methods, and systems described herein may be used for online condition monitoring of components that commonly overheat within high-voltage electrical equipment. Information may be transmitted to a wireless, passively-powered device that provides an indication to a user that a monitored item has overheated. It may also be used for online monitoring of specific components within high-voltage electrical equipment and other oil-filled equipment.

According to one aspect of this disclosure, a device is provided for responding to a threshold temperature of an electrical component. The device has, among other things, a first section, a reservoir, detectable material (e.g., a perfluorocarbon) located within the reservoir, a fill valve for introducing the detectable material into the reservoir, and a rupture disk for releasing the detectable material from the reservoir when the electrical component reaches the threshold temperature. In operation, the first section of the device is used to connect the device to the electrical component, and the first section is partially surrounded by the reservoir.

According to another aspect of this disclosure, a device is provided for responding to an overheated condition of an electrical component. The device may have a reservoir, compressible material located within the reservoir, a transparent or translucent bulb in fluid communication with the reservoir, and a rupture disk for releasing the compressible material from the reservoir when the electrical component reaches a threshold temperature, such that the compressible material flows into the bulb to initiate or enable a detectable light-emission process. According to a preferred embodiment, the reservoir and the bulb are attached to the electrical component such that the temperature of the compressible material is correlated to the temperature of the electrical component. If desired, the emitted light may be fluorescent or phosphorescent. If desired, fluorescent particles may be detected by ultraviolet light to enable maintenance personnel to scan the connections after dark.

According to yet another aspect of this disclosure, a device for responding to a condition of an electrical component has a reservoir, a compressible material located within the reservoir, a driven device, and a rupture disc for transmitting energy from the compressible material to the driven device to generate a signal that the electrical component has reached a threshold elevated temperature. If desired, the driven device may be a mechanical piezoelectric generator. But according to an alternative embodiment, the driven device may have a discharge orifice for generating an acoustic signal detectable by an acoustic emission monitoring system. If desired, the acoustic signal may be ultrasonic so that it is not detected by unauthorized persons.

The foregoing has outlined rather broadly certain features and technical advantages so that the detailed description that follows may be better understood. Additional features and advantages will be described hereinafter. It should be appreciated by those in the art that the illustrated embodiments may be readily used as a basis for modifying or designing other structures for carrying out the same or similar purposes. It should also be realized by those in the art that such equivalent constructions do not depart from the spirit and scope of the inventions forth in the claims.

DETAILED DESCRIPTION

Figure 1:
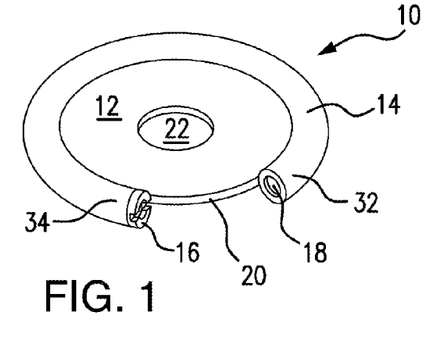
FIG. 1 is a perspective view of a temperature indicator washer device constructed in accordance with one embodiment of this disclosure.
Figure 2:
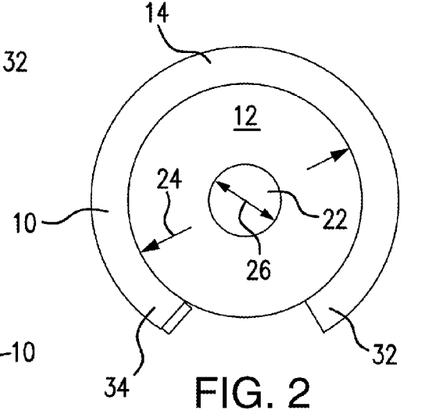
FIG. 2 is a top view of the washer device of FIG. 1.

Referring now to the drawings, where like elements are designated by like reference numerals, there is shown in FIG. 1 a temperature indicator washer device 10 that is constructed in accordance with one embodiment of this disclosure. The washer device 10 is configured for use within an oil-filled transformer and/or oil-filled regulator. Neither the transformer nor the regulator is shown in FIG. 1. The washer device 10 has a washer 12, a reservoir tube 14, a fill valve 16, and a rupture disk 18.

Figure 3:
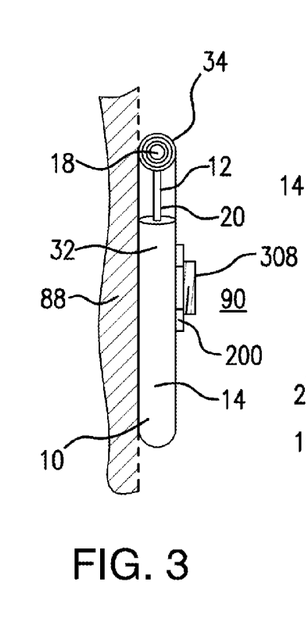
FIG. 3 is a side view of the washer device of FIG. 1, with the washer device immersed in oil and connected to a portion of a transformer or load tap changer.
Figure 4:
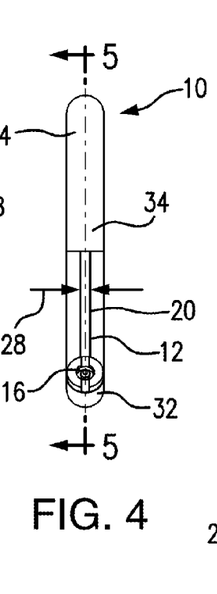
FIG. 4 is another side view of the washer device of FIG. 1.
Figure 17:
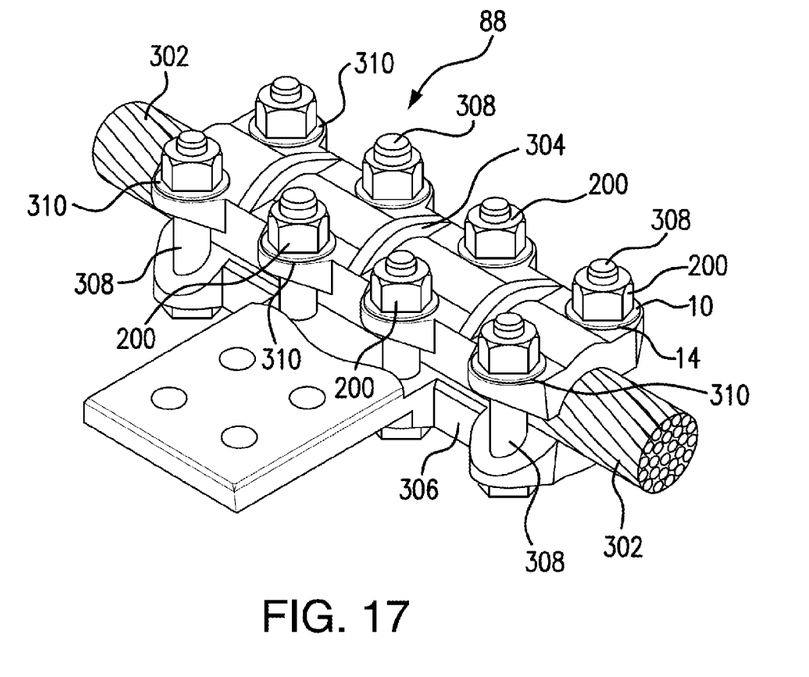
FIG. 17 is a perspective view of a bolted connection, where the temperature indicator washer device of FIG. 1 is bolted to the bolted connection.

The washer 12 may be formed of stainless steel or another suitable material. The washer 12 may be in the form of a flat disk with a circular periphery 20 and a central, circular aperture 22. In operation, a bolt, screw, or other fastening device extends through the aperture 22 to secure the washer device 10 to an electrical device 88 (FIG. 3) (for example, a bolted connection within a transformer or portion of a load tap changer) at a desired location within the oil 90 of an electrical apparatus (for example, the transformer/regulator). The fastening device (e.g., bolt 308) for securing the washer device 10 to the electrical device 88 is illustrated in FIGS. 3 and 17. Only one end of the bolt 308 is visible in FIG. 3. The other end of the bolt 308 is inserted into and connected to the electrical device 88.

Figure 5:
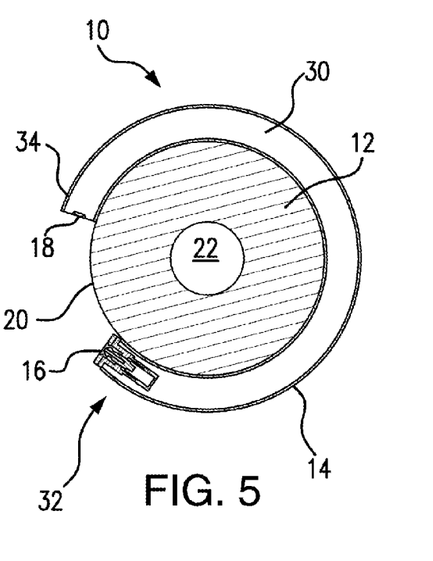
FIG. 5 is a cross-sectional view of the washer device of FIG. 1, taken along the line 5-5 of FIG. 4.

The reservoir 14 is attached to the periphery 20 (FIG. 5) of the washer 12, and extends around most, but not all, of the periphery 20. The reservoir 14 may be formed of stainless steel or another suitable material. The reservoir 14 may be connected to the washer 12 by brazing, or one or more welds, or an adhesive (not shown).

The reservoir 14 contains a detectable trace material 30, and has first and second ends 32, 34. The trace material 30 is introduced into the reservoir 14 through the fill valve 16, at the first end 32 of the reservoir 14. The fill valve 16 prevents the trace material 30 from exiting the reservoir 14 through the first end 32. The trace material 30 may be entrained, dissolved, or contained within a suitable, compressible charge material, which may be compressed air, carbon dioxide (CO$_2$), or another suitable gas or liquid.

The rupture disk 18 is configured to burst at a predetermined pressure. In operation, the pressure of the trace material 30 increases as the temperature of the washer device 10 increases. When the temperature of the washer device 10 reaches a predetermined temperature, the pressure of the trace material 30 increases to a point (e.g., 515 pounds per square inch) where the pressure bursts the rupture disk 18, such that the trace material 30 is dispersed into the oil 90 (FIG. 3) of the transformer/regulator, to be detected immediately by a suitable monitoring or detection device.

The washer device 10 may be formed mainly or entirely of stainless steel or some other rugged and heat-conductive material. In operation, the temperature of the washer device 10 correlates to the temperature of the portion 88 of the transformer/regulator to which the washer 12 is connected. Thus, the washer device 10 can be used to detect a threshold elevated-temperature condition at the portion 88 of the transformer/regulator to which the washer 12 is connected. For example, the trace material 30 (which may be, for example, hexafluorobenzene) may be entrained in a medium that has a pressure/temperature relationship such that at a temperature of 250° C., the pressure within the reservoir 14 is 515 psi.

The illustrated rupture disk 18 may be selected to burst when the pressure reaches 515 psi, indicating that the electrical component 88 being monitored has reached 250° C. The particular pressure and temperature, however, are illustrative. Other rupture disks having different thicknesses and other dimensions may be employed to burst at different threshold pressures. This disclosure is not limited to the particular pressures and temperatures described herein.

The volume of the oil 90 within the high voltage transformer may be, for example, in the range of from about 750 gallons to about 3,000 gallons. If the oil 90 is in a load tap changer apparatus, the volume of the oil 90 may be, for example, in the range of from about 150 gallons to about 1,200 gallons. The washer device 10 may be used, however, to detect temperature in a variety of electrical apparatuses, and is not limited to the oil-filled apparatuses described herein. If desired, the insulating oil 90 may be replaced or supplemented by another insulating liquid, or a gas, including but not limited to sulfur hexafluoride (SF$_6$).

Referring now to FIG. 17, the temperature indicator washer device 10 may be connected to a coupling device 88, which is attached to an electrically conductive cable 302. (The coupling device 88 is an example of the electrical device 88 shown schematically in FIG. 3. This disclosure is not limited to the illustrated electrical device.) The coupling device 88 has first and second sections 304, 306, eight bolts 308 for connecting the sections 304, 306 together, eight conventional washers 310 located on the bolts 308, and seven conventional, threaded nuts 200 for tightening the bolts 308 and thereby securing the first section 304 to the second section 306.

According to the illustrated embodiment, a temperature indicator washer device 10 is located between the first section 304 and one of the conventional nuts 200, with the main body of the respective bolt 308 extending though the central aperture 22 (FIG. 1) of the washer device 10. By threadedly tightening the nut 200, the washer device IO is captured between the nut 200 and the first section 304, such that the washer device 10 is fixedly secured to the coupling device 88.

Figure 6:
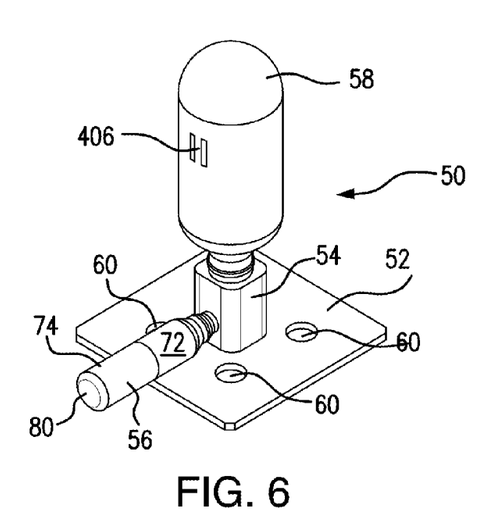
FIG. 6 is a perspective view of a temperature indicator light-emitting device constructed in accordance with another embodiment of this disclosure.
Figure 7:
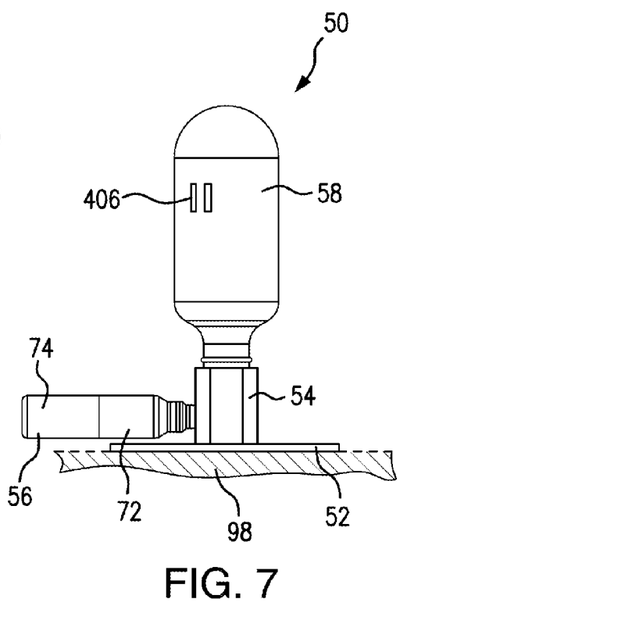
FIG. 7 is a side view of the light-emitting device of FIG. 6, with the device located in the outside air and attached to a high-voltage electrical device.
Figure 14:
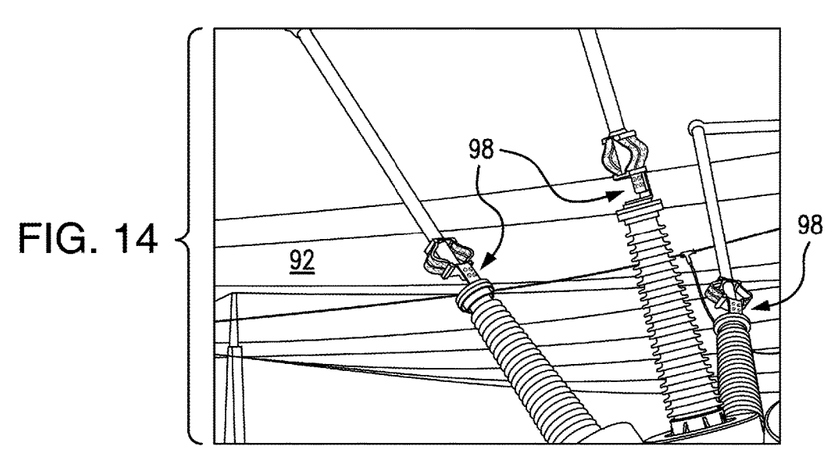
FIG. 14 is another view of the high-voltage electrical device of FIG. 7.

Turning now to FIG. 6, there is shown a light-emitting temperature indicator device 50 that is configured for use with an electrical apparatus. The device 50 may, if desired, be used to emit fluorescent light when illuminated by an ultraviolet light source at a connection portion 98 (FIG. 14) of an electrical apparatus (or an interconnecting bus) that is located outdoors, to indicate that the portion 98 has reached a threshold temperature. The electrical apparatus 98 is not shown in FIG. 6 but is illustrated in FIGS. 7 and 14.

Figure 8:
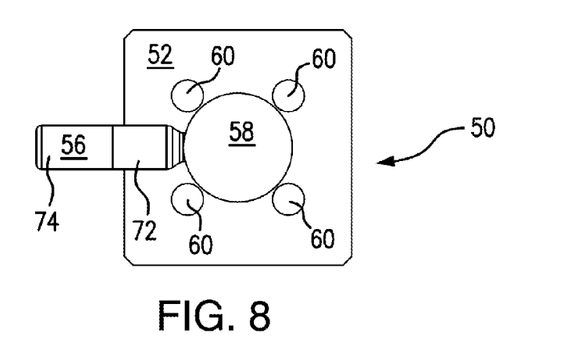
FIG. 8 is a top view of the light-emitting device of FIG. 6.

As illustrated in FIG. 6, the light-emitting device 50 has a base 52, a transition 54, a pressure canister 56, and a glass bulb 58. The base 52 may have apertures 60 for receiving bolts, screws, or other connecting devices, for attaching the device 50 to the monitored portion 98 of the electrical apparatus (FIGS. 7 and 14). The base 52 (FIG. 7) may have, for example, four such apertures 60, as shown in FIG. 8, in the form of a 4-inch NEMA standard configuration to match the bolt-connection configuration of the monitored portion 98 (FIG. 14).

The transition 54 (FIGS. 7 and 9) is immovably connected to the base 52 by brazing, welding, threaded fasteners, an adhesive, or some other suitable mechanism. The body 54 has first and second threaded openings 62, 64 (FIG. 10), and an L-shaped passageway 66. The canister 56 and the glass bulb 58 are threadedly connected to the first and second openings 62, 64, respectively. The openings 62, 64 are in fluid communication with the passageway 66 such that a gas or other fluid that enters the transition 54 through the first opening 62, from the canister 56, passes through the passageway 66, exits the support element 54, and enters the glass bulb 58.

Figures 9, 10, 11:
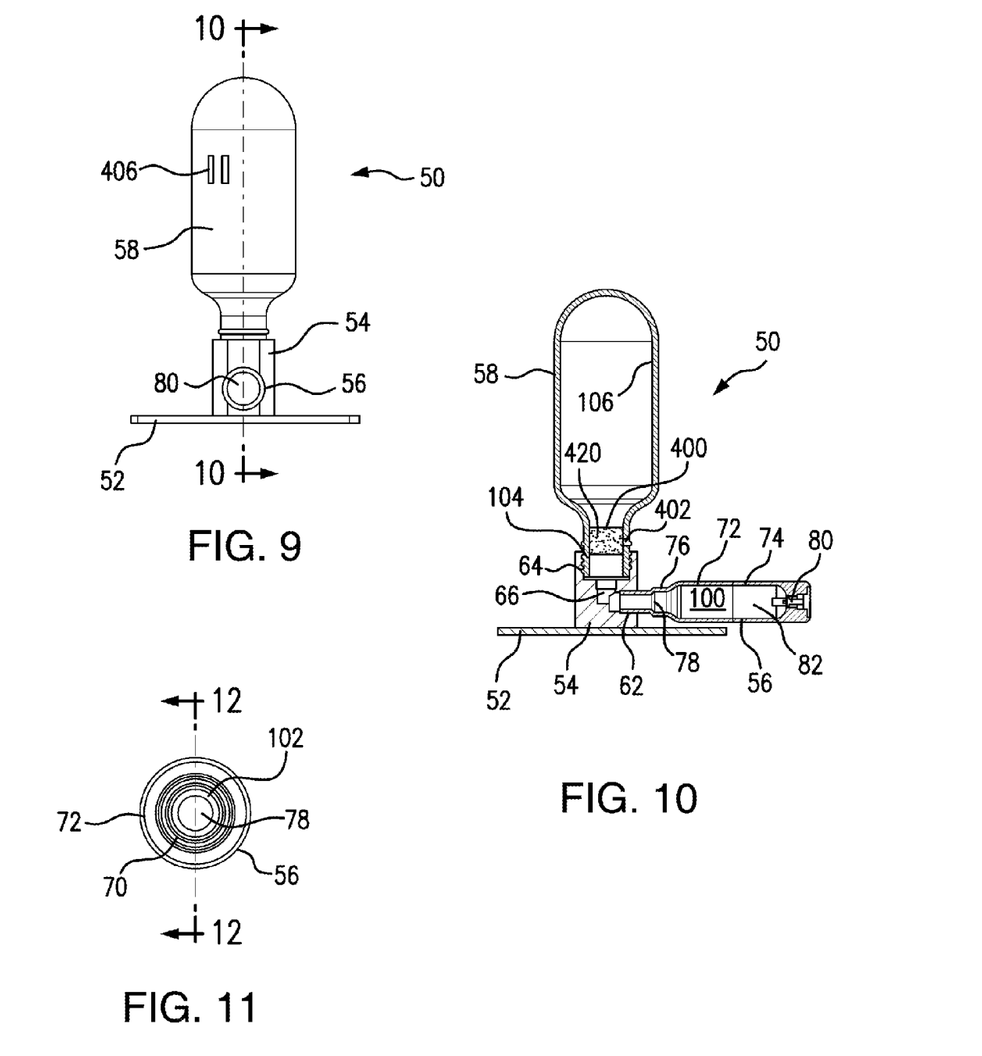
FIG. 9 is another side view of the light-emitting device of FIG. 6.
FIG. 10 is a cross-sectional view of the light-emitting device of FIG. 6, taken along the line 10-10 of FIG. 9.
FIG. 11 is an end view of a pressure reservoir (e.g., a CO$_2$ cartridge) for the light-emitting device of FIG. 6.

The L-shaped (66) configuration shown in FIG. 10 is advantageous because it reduces the overall height of the device 50. It can also be used to maximize force retention. But according to an alternative aspect of this disclosure, the glass bulb 58 may be axially aligned with the pressure canister 56, if desired.

Figure 12:
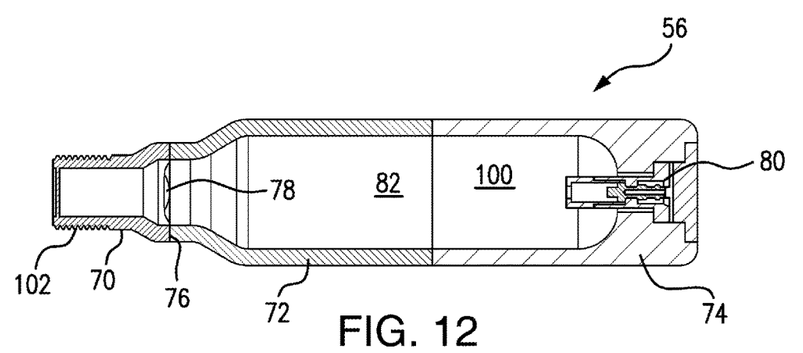
FIG. 12 is a cross-sectional view of the pressure reservoir of FIG. 11, taken along the line 12-12.
Figure 13:
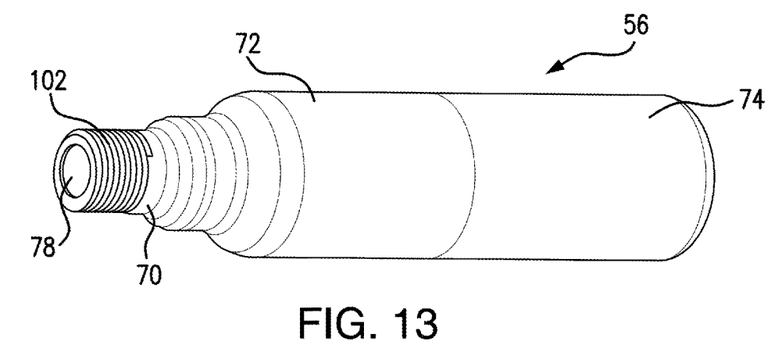
FIG. 13 is a perspective view of the pressure reservoir of FIG. 12.

The pressure canister 56 is sometimes referred to herein as a cartridge 56, or as a $CO_2$ cartridge 56. As illustrated in FIGS. 12 and 13, the pressure cartridge 56 has a threaded section 70, a main section 72, and a fill-valve section 74. The periphery 76 (FIG. 12) of a rupture disk 78 is securely captured and held between the threaded and main sections 70, 72 and a fill valve 80 is located within an opposite end of the fill-valve section 74. A reservoir 82 is located within the main section 72 and the fill-valve section 72, between the rupture disk 78 and the fill valve 80.

Compressed gas (for example, compressed carbon dioxide) 100 may be introduced into the reservoir 82 through the fill valve 80, and the compressed gas 100 is stored within the reservoir 82. The pressure cartridge 56 has threads 102 that are threadedly connected to the threads of the first opening 62 of the transition 54. The size and shape of the cartridge 56 (which may be, for example, a $CO_2$ cartridge) may be modified according to desired conditions and usages.

The base 52, the transition 54, and the pressure canister 56 may all be made of a suitably rugged and heat-conducting material, such as stainless steel. In operation, the heat-conducting material causes the temperature within the reservoir 82 to be highly correlated to the temperature of the connection portion 98 (FIGS. 7 and 14) of the electrical apparatus to which the base 52 (FIG. 7) of the light-emitting device 50 is attached.

As the temperature of the connection portion 98 increases, the temperature of the compressible material 100 likewise increases, and the pressure of the material 100 increases. When the compressible material 100 reaches a predetermined pressure, it bursts the rupture disk 78, such that the material 100 flows, following a pressure gradient, into the glass bulb 58 through the transition 54. As the gas 100 flows into the bulb 58, it opens a foil seal 400 located within the neck 402 of the bulb 58. The foil seal 400 contains a charge of particles 420, which may include phosphorescent or fluorescent material. According to another embodiment, the foil seal 400 containing the charge of particles 420 may be advantageously located within the transition 54. In either embodiment, the flowing gas 100 causes the particles 420 to disperse within the bulb 58, such that at least some of the particles 420 adhere to the inner surface of the bulb 58.

The phosphorescent or fluorescent particles 420 may be stored, if desired, in the neck 402 of the bulb 58, supported by the foil seal 400. The foil seal 400 is easily disrupted and the particles 420 are released from the seal 400 and propelled into the globe 58 by the pressure released from the pressure cartridge 56 when the rupture disc 78 bursts. According to a preferred embodiment, the foil seal 400 is in the form of a foil packet 400, and the particles 420 are contained within the foil packet 400, which ruptures at minimal pressure. The globe 58 may be vented to atmosphere, by suitable vents 406, illustrated schematically in FIGS. 6, 7, and 9, to enable the pressure (100) to evacuate through the vents 406, propelling the particles 420 into the globe 58. If desired, the globe 58 may be entirely or partially filled with stainless steel wool, or other media (not shown). The steel wool or other media may be used to filter or entrap the particles 420 as they are propelled in the direction of the exhaust 406. The charge (400) may contain various prescribed sizes of particles 420 in order to enlarge the area of fluorescence (or phosphorescence) as the particles 420 are entrapped by varying densities of filtration media.

The glass bulb 58 may be formed of Pyrex frosted glass or another suitable, preferably transparent or translucent, and preferably non-breakable, material. The bulb 58 has threads 104 formed of glass or another suitable material, which are threaded (moisture-tight) into the threads of the second opening 64 of the support element 54. At least a portion of the interior of the bulb 58 is coated with a suitable material 106 (FIG. 10), providing a surface to which the fluorescent (or phosphorescent) material will adhere. According to one aspect of this disclosure, the fluorescent (or phosphorescent) particles 420 adhere to the coating 106 (or the steel wool or other media). If the particles 420 contain fluorescent material, then fluorescent light is generated that is visible when the bulb 58 is illuminated by an ultraviolet light source from outside the bulb 58. If the particles 420 contain phosphorescent material, then the particles 420 absorb energy from the sun (or another energy source) and then emit light that is visible from a position remote from the electrical equipment 98. The bulb 58 may be located outside, in the outdoor air 92 (FIG. 14).

In operation, the transparent or translucent globe 58 with the interior coating 106 (or the steel wool or other media) captures and holds the fluorescent (or phosphorescent) particles 420. Thus, a rise in temperature of the electrical connection portion 98 (to which the light-emitting device 50 (FIG. 7) is attached) causes the rupture disc 78 to burst. The globe 58 retains the particles 420 and light is emitted (e.g., when illuminated by UV light) and the light may be detected from outside the bulb 58, at a remote location, as a signal that the electrical apparatus 98 reached the threshold temperature.

The substation crew would use a high intensity UV light to scan the equipment connections for UV emittance of the material, that being an indication the target temperature has been reached. There are many suitable materials and substances that are detectable using UV excitation. The interior of the globe 58 may be either etched or have a coating to which the particles 420 will adhere upon activation. Bursting of the rupture disc 78 disperses the particles 420 into the globe 58 which enables the substation crew to make scans for overheated connections using UV lighting after sunset.

Figure 15:
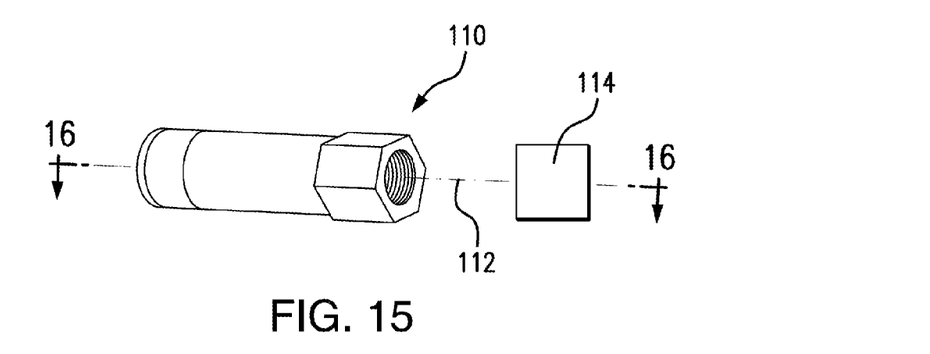
FIG. 15 is a perspective view of a temperature-responsive device constructed in accordance with yet another embodiment of this disclosure.
Figure 16:
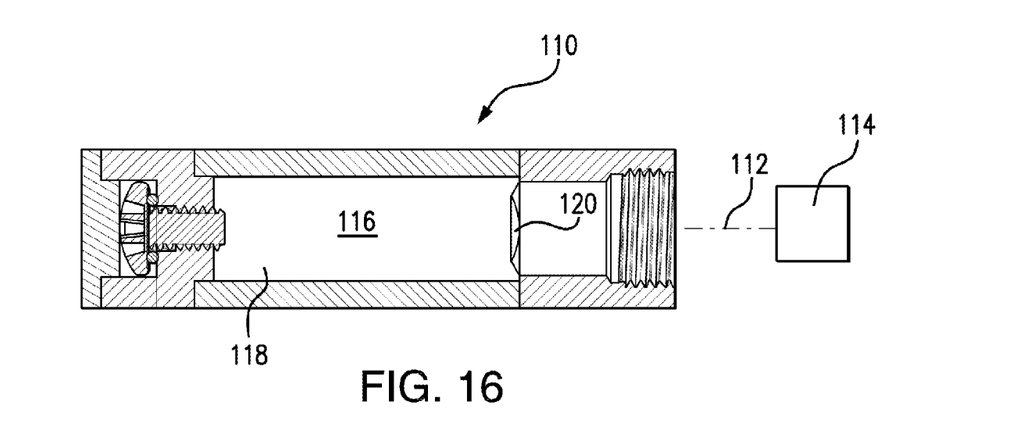
FIG. 16 is a cross-sectional view of the device of FIG. 15, taken along the line 16-16.

Turning now to FIGS. 15 and 16, there is shown a temperature indicating device 110 constructed in accordance with yet another aspect of this disclosure. The FIGS. 15 and 16 device 110 uses a temperature-induced pressure rupture to operate as an engine to drive (112) an independent device 114. As illustrated in FIG. 16, when a chemical 116 located within a reservoir 118 reaches a threshold activation pressure (for example, 500 psi), a rupture disk 120 bursts to create working-pressure energy, which drives, through a suitable mechanism 112, the independent device 114.

The independent device 114 may be, for example, a mechanical piezoelectric spark generator, and the driving mechanism 112 may be, for example, a ball bearing or piston, that is accelerated by the pressure released by the bursting of the rupture disk 120. In operation, the pressure energy is converted to mechanical energy, for example, to strike a suitable piezoelectric crystal assembly such that it generates a spark, or discreet electric signal, or to create an energy pulse that is detected by a sensor, or signal-receiving device that is mounted onto or into a compartment wall, or some other suitable device.

According to another aspect of this disclosure, a suitable device 114 may use the pressure discharge (112) to generate a piezoelectric spark (piezoelectric spark generators are commonly used in cigarette lighters), that can be detected by a suitable partial discharge monitoring system, or to actuate a lab-on-a-chip.

According to another aspect of this disclosure, a suitable device 114 may channel the sudden pressure release (112) via a suitable discharge orifice to generate a discreet acoustic (preferably ultrasonic) signal or pulse that can be detected by an acoustic emission monitoring system. Oil 90 may serve as an attenuator for communicating the acoustic signal to the acoustic monitoring device.

Returning now to FIGS. 1-5, a device 10 may be used to respond to a threshold temperature of an electrical component 88. The illustrated device 50 includes a first section 12 for connecting (22, 308, 200) the device 10 to the electrical component 88, a reservoir 14 (the first section 12 being at least partially surrounded by the reservoir 14), a detectable material 30 located within the reservoir 14, a fill valve 16 for introducing the detectable material 30 into the reservoir 14, and a pressure-sensitive rupture disk 18 for releasing the detectable material 30 from the reservoir 14 when the electrical component 88 reaches the threshold temperature.

As illustrated in FIGS. 1-5, the first section 12 may be in the form of a flat washer with an aperture 22 and a periphery 20. The reservoir 14 may be connected to the washer periphery 20, the reservoir 14 may include a heat-conducting material, such as stainless steel, and the detectable material 30 may include a perfluorocarbon. The washer-shaped device 10 may be connected to electrical equipment 88 by a bolt 308.

As illustrated in FIGS. 6-14, a device 50 may be used to respond to a condition of an electrical component 98. The illustrated device 50 includes a reservoir 56 (which may be a $CO_2$ cartridge), a compressible material 100 located within the reservoir 56, a transparent or translucent bulb 58 in fluid communication (66) with the reservoir 56, and a rupture disk 78 for releasing the compressible material 100 from the reservoir 56 when the electrical component 98 reaches a threshold temperature, such that the compressible material 100 flows into the bulb 58, so that the bulb 58 becomes a signal-emitting, detectable light source, as discussed above.

The device 50 may have a base 52 for attaching (60) the reservoir 56 and the bulb 58 to the electrical component 98, such that the temperature of the compressible material 100 is correlated to that of the electrical component 98. If desired, a flow channel 66 may be used to change the direction of flow of the compressible material 100 from the reservoir 56 to the bulb 58, where the reservoir 56 and the bulb 58 are not axially aligned. The compressible material 100 may be used to disperse fluorescent or phosphorescent particles, or other material that emits fluorescent or phosphorescent light when exposed to radiation.

As illustrated in FIGS. 15 and 16, a device 110 may be used to respond to a condition of an electrical component. The device 110 includes, among other things, a reservoir 118, a compressible material 116 located within the reservoir 118, a driven device 114, and a rupture disc 120 for transmitting energy from the compressible material 116 to the driven device 114 to generate a signal (e.g., electromagnetic or acoustic) when the electrical component reaches a threshold high temperature.

The entire disclosures of U.S. patent application Ser. No. 14/090,313 (now U.S. Pat. No. 9,683,897), Ser. No. 13/047,773 (now U.S. Pat. No. 8,702,304), Ser. No. 15/597,623 (filed May 17, 2017), and 61/313,418 (filed Mar. 12, 2010) are hereby incorporated herein by reference in their entireties.

While inventions have been illustrated and described with references to preferred embodiments thereof, it will be understood by those skilled in the art that various changes in form and details may be made to the preferred embodiments without departing from the spirit and scope of the inventions. Moreover, it will be understood that the scope of the claimed invention should not be limited by the title of this disclosure.

What is claimed is:

1. A device for responding to a threshold temperature of an electrical component, the device comprising:
    a first section for connecting the device to the electrical component, wherein the first section is in the form of a washer, with an aperture and a periphery;
    a reservoir, the first section being at least partially surrounded by the reservoir;
    a detectable material located within the reservoir;
    a fill valve for introducing the detectable material into the reservoir; and
    a rupture disk for releasing the detectable material from the reservoir when the electrical component reaches the threshold temperature.

2. A method of using the device of claim 1, wherein the reservoir contains compressed gas, and wherein the detectable material within the reservoir includes a trace chemical, and wherein the method comprises a step of monitoring a surrounding environment for the trace chemical, or performing an oil analysis or diagnostics test, after release of the trace chemical from the reservoir.

3. The device of claim 1, wherein the reservoir is connected to the periphery of the washer.

4. The device of claim 3, wherein the reservoir includes a heat-conducting material.

5. The device of claim 1, wherein the detectable material includes a perfluorocarbon.

* * * * *